United States Patent [19]
Snodgrass et al.

[11] Patent Number: 4,970,636
[45] Date of Patent: Nov. 13, 1990

[54] MEMORY INTERFACE CONTROLLER

[75] Inventors: Thomas D. Snodgrass; Douglas A. Fischer; Jennifer A. Graves; Jordon W. Woods, all of Albuquerque, N. Mex.

[73] Assignee: Honeywell Inc., Minneapolis, Minn.

[21] Appl. No.: 299,794

[22] Filed: Jan. 23, 1989

[51] Int. Cl.⁵ ................... G06F 15/68; G06F 15/72
[52] U.S. Cl. ................... 364/518; 364/521; 340/723; 340/750
[58] Field of Search ........ 364/518, 521, 200 MS File, 364/900 MS File; 340/747, 750, 798, 799, 723, 727; 382/46

[56] References Cited

U.S. PATENT DOCUMENTS 4,805,117 2/1989 Fiore et al. ........................ 364/518
4,821,209 4/1989 Hempel et al. ................... 364/518
4,860,249 8/1989 Nicely et al. ..................... 364/900

OTHER PUBLICATIONS

Crow, F. C., "Shaded Computer Graphics in the Entertainment Industry", Comp Con, Sprg 79, pp. 382–393.
Fujimoto et al., "A 3-D Graphics Display System with Depth Buffer and Pipeline Processor", 1984 IEEE CG&A, pp. 49–61.

Primary Examiner—Gary V. Harkcom
Assistant Examiner—Phu K. Nguyen
Attorney, Agent, or Firm—Haugen and Nikolai

[57] ABSTRACT

A memory interface controller apparatus for use in a digital system, such as a graphics display system. The apparatus comprises apparatus for receiving incoming pixel data and apparatus for detecting pixel address collision. In an alternate embodiment, apparatus for performing hidden surface removal on the incoming pixel data is included. The memory interface controller apparatus further may include apparatus for construction of images with transparent objects.

4 Claims, 7 Drawing Sheets

4,970,636

MEMORY INTERFACE CONTROLLER

U.S. GOVERNMENT RIGHTS

The United States Government has contributed to the development of the invention and has obtained certain rights therein.

FIELD OF THE INVENTION

This invention relates generally to a memory interface controller for use in a digital system and, more particularly, to a VLSI memory interface control apparatus which can operate in synchronous or asynchronous modes and be used in a 3-D color graphics display in real time.

BACKGROUND OF THE INVENTION

Three dimensional (3-D) graphics systems are used for providing, for example, video or liquid crystal displays (LCDs) of aeronautical charts and other digitized visual information. Performance requirements in such systems demand, among other things, 3-D color graphics in real time, the ability to allow solid objects to remain visible behind transparent objects, high throughput of massive amounts of data and volume clipping of pixels (i.e. the ability to view a scene sliced along the Z axis representative of depth in conventional three-dimensional space). Conventional memories do not operate at high enough speeds to meet such requirements. In particular, no VLSI or other devices are believed to be known in the art which can generate 3-D color graphics in real time for a 20 Hz, 512 x 512 display.

The invention overcomes the apparent deficiencies of prior art devices by providing an asynchronous memory interface to maximize system throughput in a 3-D color graphics display system. In addition, all calculations are carried out in a pipeline so that a translucent, Z-buffered pixel can be written every 1 to 2 memory cycles.

The invention also provides an ability to partition memory which increases effective memory bandwidths while minimizing hardware.

SUMMARY OF THE INVENTION

A memory interface controller (MIC) apparatus for use in a digital system, such as a graphics display system, is disclosed. The apparatus comprises means for initializing the system memory, means for receiving incoming pixel data and means for performing hidden surface removal on the incoming pixel data. The apparatus further comprises means for construction of images with transparent objects.

It is one object of the invention to provide a memory interface to maximize system pixel throughput.

It is another object of the invention to provide a memory interface which writes a translucent, Z-buffered pixel every 1 to 2 memory cycles.

It is yet another object of the invention to increase effective memory bandwidths while minimizing memory interface and control hardware.

It is yet another object of the invention to eliminate external memory initialization and self-test hardware.

It is yet another object of the invention to provide a means for hidden surface removal on incoming pixel data.

It is another further object of the invention to provide a means for construction of images with transparent objects.

It is still another further object of the invention to provide a memory interface control apparatus which can be used in parallel with other similar memory interface controls wherein each control operates independently from the other controls in order to achieve a higher rate of throughput of information.

It is yet another further object of the invention to provide an apparatus capable of supporting an arbitrary screen size.

It is yet another object of the invention to omit writing pixels to memory if they have been volume clipped or Z-clipped to allow for higher throughput.

Other objects, features and advantages of the invention will become apparent to those skilled in the art through reference to the detailed description of the preferred embodiments, claims and drawings herein.

BRIEF DESCRIPTION OF THE DRAWINGS

The following is a brief description of the drawings wherein like reference numerals denote similar elements.

DETAILED DESCRIPTION OF THE PREFERRED EMBODIMENT

Figure 1:
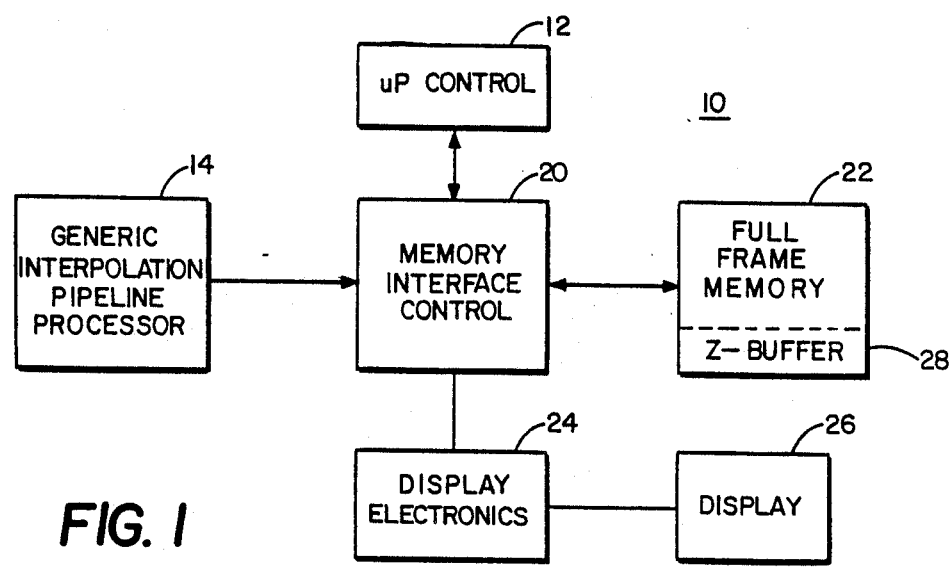
FIG. 1 is a block diagram of the memory interface control of the invention showing schematically its relationship to other components in a 3-D color display graphics system.

FIG. 1 is a block diagram showing schematically the relationship of the memory interface control of the invention to other components in a three dimensional color display graphics system. The graphics system includes a microprocessor control (uP) 12, a generic interpolation pipeline processor 14, memory interface control 20, full frame memory (FFM) 22, display electronics 24, and display 26. The microprocessor control ma be any standard microprocessor suitable for use in high speed graphics applications. In one embodiment of the invention, the microprocessor used was a 68020 as manufactured by Motorola. The generic interpolation pipeline processor (GIPP) 14 may be comprised of standard components and is described in more detail hereinbelow. In general, the GIPP outputs pixels with a red, green, blue (RGB) value, Z-depth, transparency factor, and priority value rendering an image without respect to where it resides. The full frame memory (FFM) 22 may conveniently be a RAM memory suitable for operation with a microprocessor, such as the 68020 model. By way of background and to further facilitate the description of the invention, it is understood by those skilled in the art that each pixel has associated with it X,Y, Z-depth, RGB transparency factor "K" and priority values. The X,Y value describes a discrete address where the pixel is to be displayed on the screen. The RGB value is then stored at that pixel address. The RGB data contains the value which determines, in a color display system, how the red, green and blue color guns are to be driven for the pixel at the location described by X and Y. Z-depth, the transparency factor K and the priority value are all useful in determining whether or not the pixel should be written into memory or displayed, for example. Use of these factors by the invention is described in more detail hereinbelow.

The display electronics 24 and display 26 are well known in the art. Display 26 in one embodiment of the invention was an LCD display, but may also be a CRT color display, in which case the display electronics would be adapted by well-known means to drive the CRT display.

In general, the MIC is responsible for building the image. It does this in the following manner:

a. It initializes the memory 22.

b. It receives incoming pixel data from the GIPP 14.

c. It performs hidden surface removal on the incoming pixel data by comparing the Z-depth of the incoming pixel to the same pixel Z-depth held in memory.

d. It performs transparency on the image if required using read/write cycles on the memory, if the K-factor is less than one. Thus, the MIC allows for construction of images with transparent objects. This processing necessitates the inclusion of a Z-buffer 28 in the full frame memory 22.

In addition to the above operations, the MIC 20 is also capable of:

a. Testing the FFM 22 for errors, including address and data checking;

b. Self-testing; and c. External testing using four input bits and one output bit over three scan paths.

Figure 2:
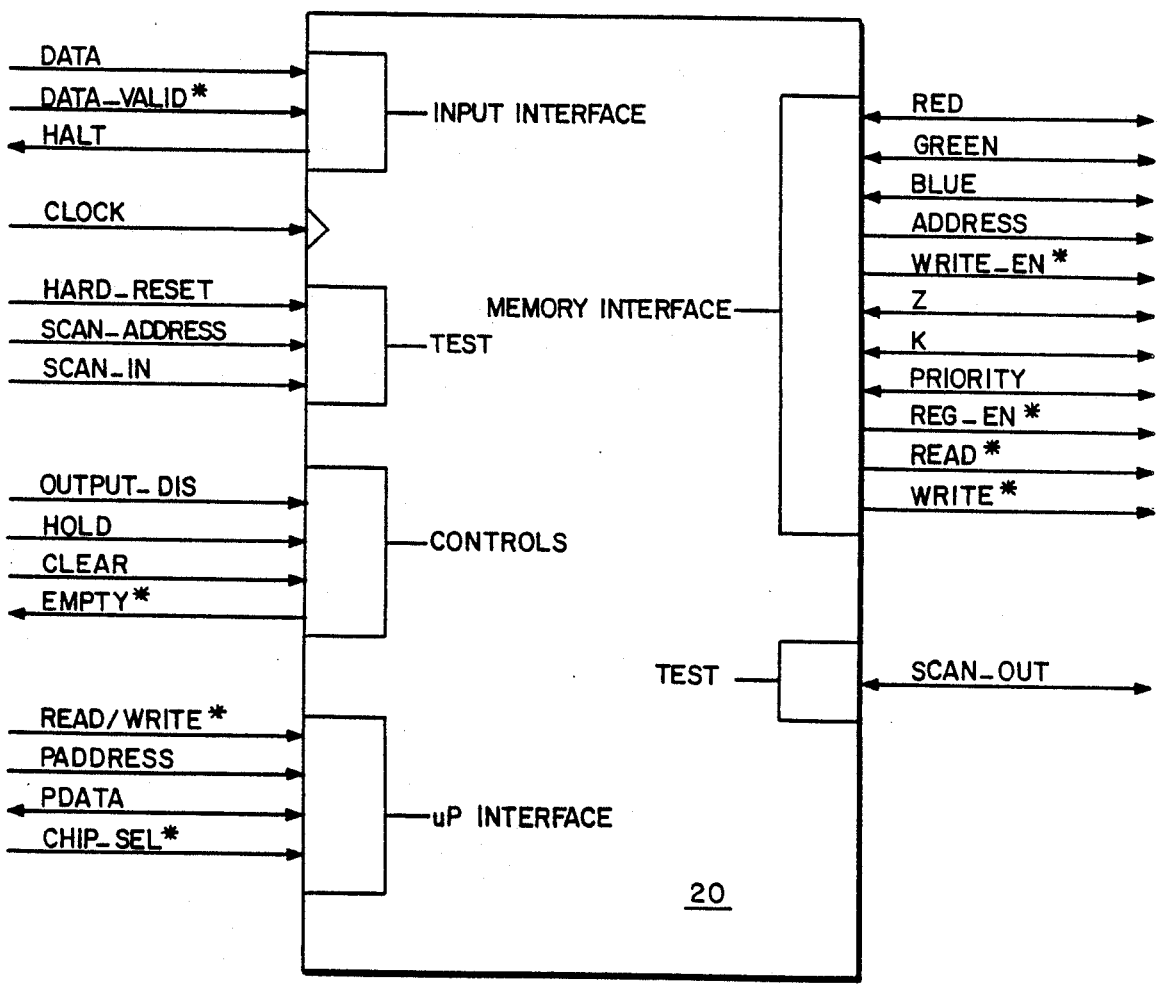
FIG. 2 shows an illustrative block diagram of a top level architectural view of the memory interface control of the invention.

Referring now to FIG. 2, an illustrative block diagram of a top level architectural view of the memory interface control 20 of the invention is shown. The MIC is comprised of the following basic sections: An INPUT INTERFACE, a CLOCK input, a TEST section, CONTROLS, a MICROPROCESSOR INTERFACE (uP INTERFACE), and a MEMORY INTERFACE. Input/Output Description.

Still referring to FIG. 2, the inputs used in one illustrative embodiment of the MIC are described below in detail. Inputs:

DATA. As is shown in FIG. 2, there are 70 bits in the input data bus. The data is received in one illustrative application of the invention from the GIPP. The data is broken out as shown in Table I herein. In one embodiment of the MIC, the DATA inputs are internally pulled down.

TABLE I

| DESCRIPTION | Input Data NUMBER OF BITS |
|---|---|
| X - ADDRESS | 12 |
| Y - ADDRESS | 12 |
| Z | 16 |
| RED | 8 |
| GREEN | 8 |
| BLUE | 8 |
| K | 4 |
| PRIORITY | 2 |

DATA_VALID*. This bit is used to indicate that incoming data from the GIPP is valid and is clocked into the MIC during a valid clock enable. A low signal on this line indicates that the data is valid.

CLOCK. The maximum clock frequency used in one embodiment of the invention is 25 MHz with a 50/50 duty cycle. In this example, all events occur on the rising edge of the clock. The clock speed must not exceed the sum of memory speed plus interface overhead.

HOLD. The HOLD bit stops the MIC pipeline and holds the MIC in its current state. HOLD can be used for system debugging by controlling the MIC to run slower than the clock speed. HOLD is active high. HOLD also stops the preceding stage, i.e. a GIPP in one useful system application. HOLD is asserted synchronously with the clock. This input is internally pulled down.

OUTPUT_DIS. The OUTPUT_DIS bit is used to tri-state the output buses. The signal is active high. The outputs shown in Table II herein are tri-stated when this bit is active. This input is internally pulled down.

TABLE II

| Tri-Stated Signals |
|---|
| RED |
| GREEN |
| BLUE |
| Z |
| K |
| PRIORITY |
| ADDRESS |
| WRITE* |
| REG_EN* |
| READ* |

Figure 3:
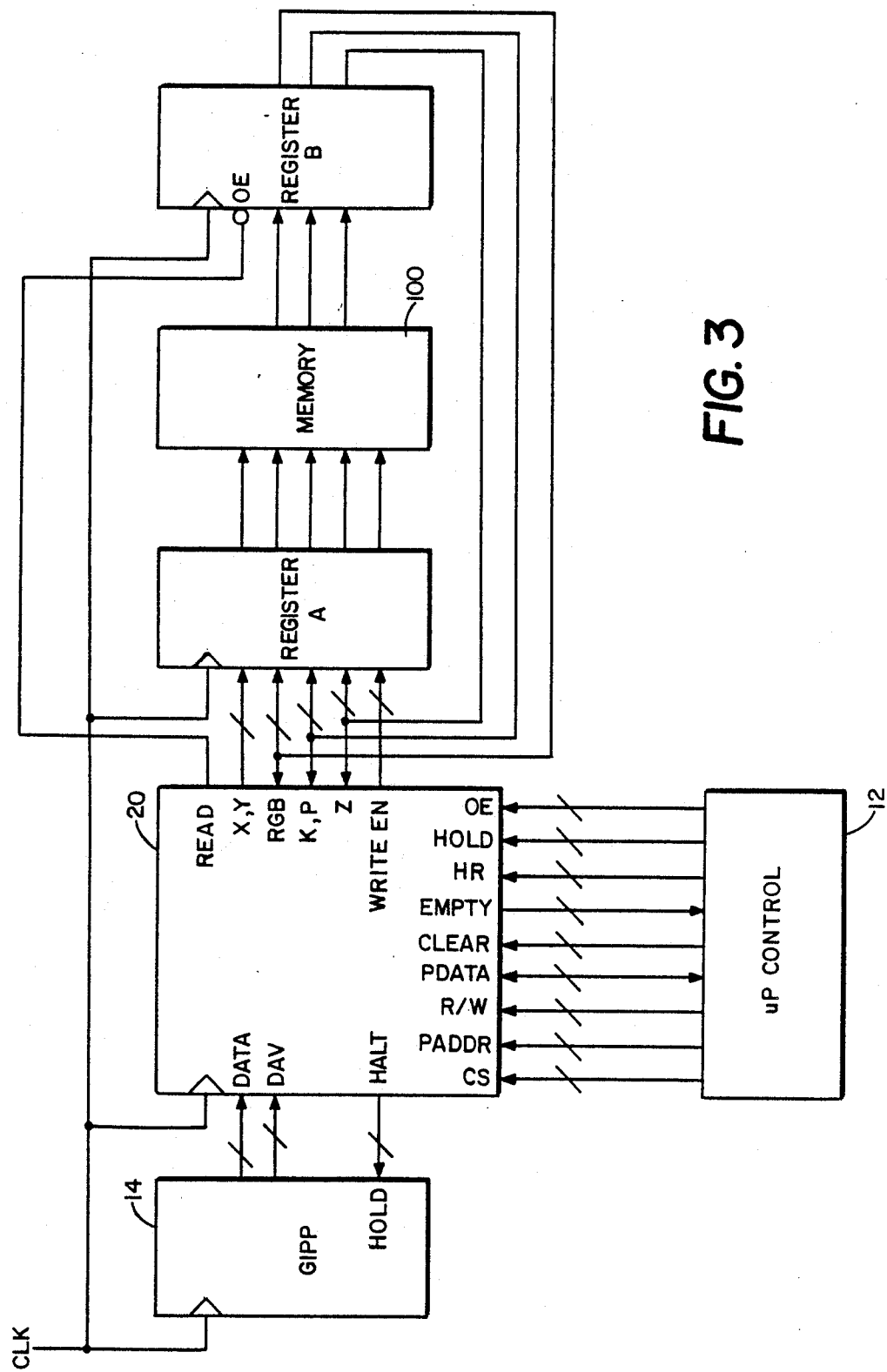
FIG. 3 is a block diagram of an example of a system application employing the memory interface control of the invention.

CLEAR*. The CLEAR* bit commands the MIC to fill the RGB memory, Z-buffer, K-buffer, and Priority buffer with data that has been loaded into the MIC's internal BACKGROUND registers shown in Table III hereinbelow when the memory clear option is enabled. These buffers are located in memory devices, such as the full frame memory, which are external to the MIC. For example, as shown in FIG. 3, the Z-buffer may be located in memory 100. Also, as is typical in the art, RG and B may advantageously be double buffered in a "ping-pong" operational scheme. When the CLEAR* signal is asserted low, the EMPTY* bit goes high. When clear operation is complete, the EMPTY* bit goes low. CLEAR* has lower priority than commanded Initiated Built-In-Test (IBIT), described below, and scan. If the memory clear option is disabled, the CLEAR* resets the MIC and does not respond with an EMPTY* bit going low. This signal is falling edge sensitive only.

READ/WRITE*. The READ/WRITE is asserted by the processor to indicate whether the processor transaction is a read or write. This signal is low for a write and high for a read.

PADDRESS. The address bits from the processor are used to address specific registers within the MIC. The list of registers and associated addresses is given in Table III below.

TABLE III

| ADDRESS | PADDRESS Registers REGISTER |
|---|---|
| 0 | LOWER_MIC_CONTROLS |
| 1 | UPPER_MIC_CONTROLS |
| 2 | LOWER_Z_BACKGROUND |
| 3 | UPPER_Z_BACKGROUND |
| 4 | LOWER_Z_FOREGROUND |
| 5 | UPPER_Z_FOREGROUND |
| 6 | K AND PRIORITY BACKGROUND |
| 7 | RED_BACKGROUND |
| 8 | BLUE_BACKGROUND |
| 9 | GREEN_BACKGROUND |
| 10 | MIC BIST RESULTS |
| 11 | RG IBIT RESULTS |
| 12 | GB IBIT RESULTS |
| 13 | BPL IBIT RESULTS |
| 14 | LOWER Z IBIT RESULTS |
| 15 | UPPER Z IBIT RESULTS |

Figure 4:
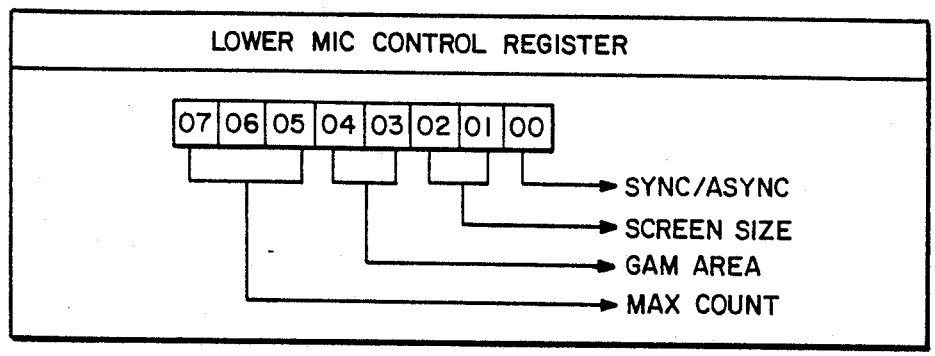
FIG. 4 is a block diagram illustrating the format of the lower memory interface control registers.

Registers 2, 3, 6, 7, 8 and 9 represent the BACKGROUND registers. Registers 10 through 15 are read only. In operation, when an image is being built by the MIC, the MIC first initializes the full frame memory by writing the data stored in the background registers at all locations. The uP INTERFACE section can control the data content of the background registers. For example, if a blue sky were desired for the display background, the background registers could be set to contain logical "0" values for red and green and a "1" value for blue. Then, when the MIC initializes the system, it will fill the entire image with a blue color. As the image is subsequently built, as in the case, for example, of terrain, the image will always be located in front of the background. Thus, the data comprising the image is written over the background. The LOWER_MIC_CONTROL register is formatted in one embodiment of the invention as shown in FIG. 4.

SYNC/ASYNC*. Still referring to FIG. 4, this is a synchronous/asynchronous signal used to configure the MIC so that its inputs can be driven by the preceding stage in a synchronous or asynchronous fashion. If the signal is high, the MIC is driven synchronously, conversely a low signal on this line drives the MIC into asynchronous operation.

SCREEN SIZE. These bits are used to clip (i.e. crop) the data to the viewable area of the screen. In one embodiment, the MIC advantageously clips to 512×512, 1024×102, 2048×2048, or 640—512 pixel screens. In one embodiment of the invention, the maximum size of the gaming area described by the input data is 4096×4096 pixels. Any pixels outside the viewable area are write inhibited. The gaming area size is determined by the GIPP capacity. Those skilled in the art will recognize that many useful combinations of gaming areas and viewable areas are possible employing the teachings of the invention. In one embodiment, it is assumed that (0,0) is in the upper left corner of 4096×4096 area. After clipping and inversion, the address (0,0) for a particular screen size is in its respective upper left corner. Table IV shows the display screen sizes which may be used in combination with the MIC.

TABLE IV

| | Screen Sizes |
|---|---|
| DATA | DESCRIPTION |
| 00 | 512 × 512 Display |
| 01 | 1024 × 1024 Display |
| 10 | 2048 × 2048 Display |
| 11 | 640 × 512 Display |

GAM_AREA. These two bits are used to set the size of the input screen. It is assumed that whatever gaming area size is selected that (0,0) is in the upper left corner. The form is given in Table V.

TABLE V

| | Input Screen Size Format |
|---|---|
| BITS | INPUT SCREEN SIZE IN NUMBER OF PIXELS |
| 00 | 512 × 512 |
| 01 | 1024 × 1024 |
| 10 | 2048 × 2048 |
| 11 | 4096 × 4096 |

MAX_COUNT. These three bits set the maximum amount of memory to be addressed during memory CLEAR and memory IBIT modes of operations. See Table VI.

TABLE VI

| | Maximum Memory Size |
|---|---|
| MAXIMUM COUNT | DESCRIPTION |
| 000 | Address entire screen |
| 001 | Address ½ screen |
| 010 | Address ¼ screen |
| 011 | Address ⅛ screen |
| 100 | Address 1/16 screen |
| 101 | Address 1/32 screen |
| 110 | Address 1/64 screen |
| 111 | Address 1/128 screen |

Figure 6:
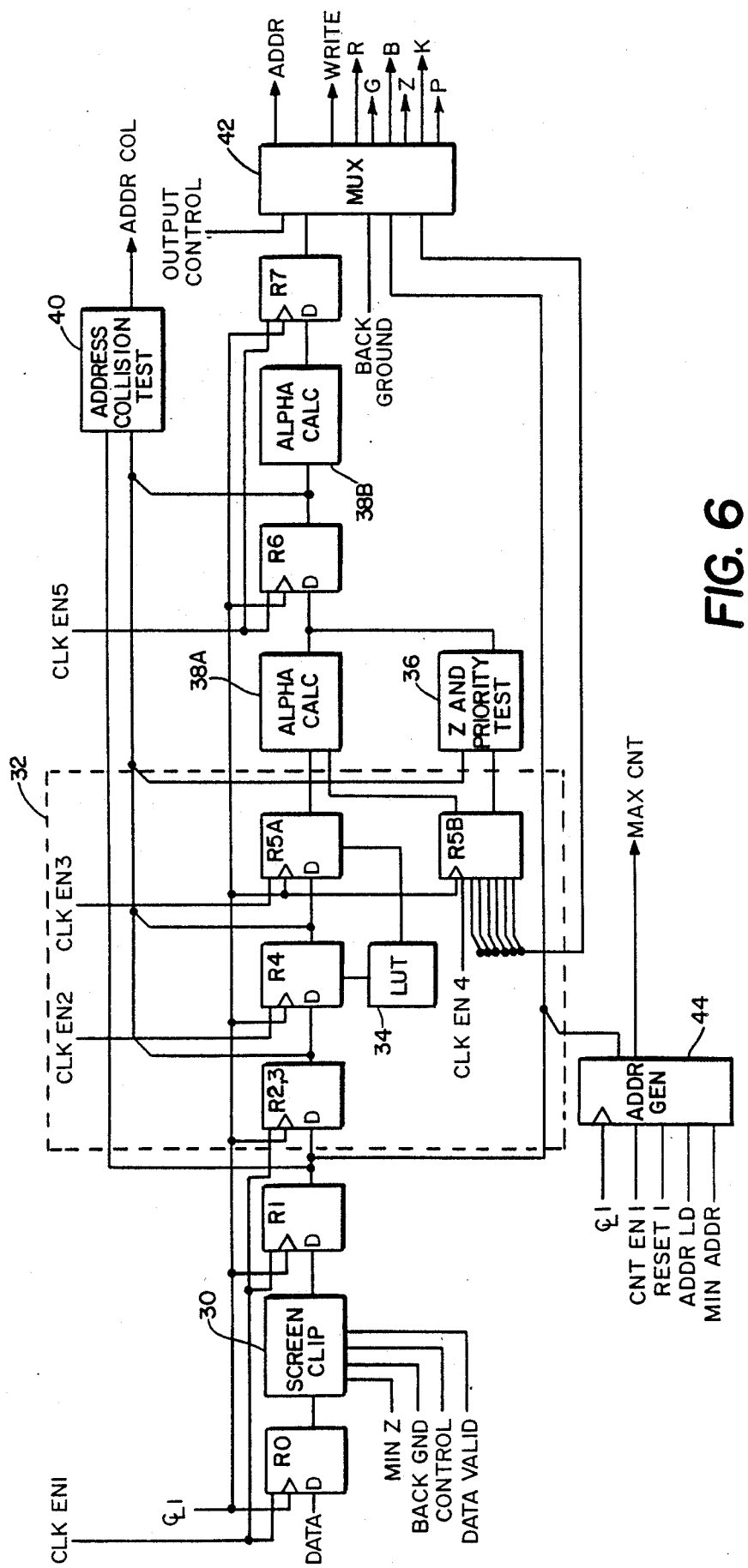
FIG. 6 is a block diagram schematically illustrating the data pipeline section of the memory interface control of the invention.

The UPPER_MIC_CONTROL register is formatted as shown in FIG. 6.

BIST. As shown in FIG. 6, the BIST bit is used to command the MIC to perform Built-In-Test (BIT) on itself. The results are stored in an internal register (Register 10) readable by the processor. When this signal is asserted high, the EMPTY* bit goes high. When all operations are complete, the EMPTY* signal goes low. This signal takes priority over all other control signals. When BIST is complete, the BIST bit returns to a low state.

Figure 5:
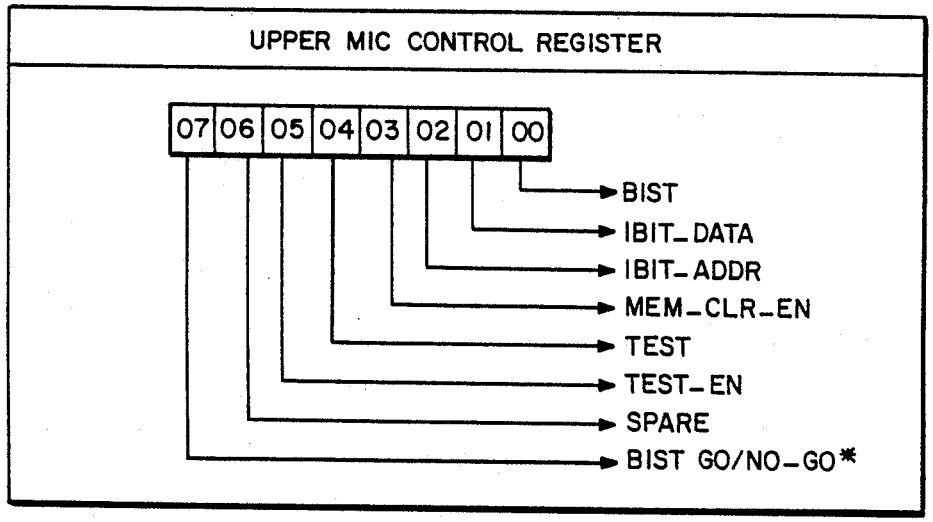
FIG. 5 is a block diagram illustrating the format of the upper memory interface control registers.

IBIT_DATA. As shown in FIG. 5, this bit can command the MIC to test all memory. The MIC loads the background data into all of the memory. Then it reads back and compares this against the background data. All errors are recorded and are readable by the uP. When this bit is asserted high, EMPTY* goes high. It goes low when the test is complete. The BIST bit takes priority over this test. When IBIT_DATA is complete, this bit returns to a low state.

IBIT_ADDR. As shown in FIG. 5, this bit can command the MIC to perform an address test on all memory. During the address test, the MIC loads an address into each location in memory. It then reads that address and compares the data. To perform this test, the memory must be as wide as the data path, otherwise errors shall result. All errors are recorded and are readable by the uP. When this bit is asserted high, EMPTY* goes low. IBIT—ADDR goes low when the test is complete. BIST and IBIT—DATA take priority over this test.

MEM—CLR—EN. As shown in FIG. 5, this bit is used to enable the MIC to clear memory if CLEAR* goes low as indicated by an active high on the ME-M—CLR—EN line.

TEST—EN. As shown in FIG. 5, this bit enables the internal counters independent of any other controls in the MIC. It multiplexes the BIST counter to the lower two bits of green, blue, and Z outputs. It multiplexes the memory clear counter to the X and Y address outputs and the two middle bits of green. This bit is active high.

BIST GO/NO—GO*. As shown in FIG. 5, this bit indicates if any failures were detected during BIST. NO—GO, signifying a test failure, is indicated by a low state. This bit is read only. This bit is valid only if BIST is high.

CHIP—SEL*. Referring again to FIG. 2, the CHIP—SEL* is asserted low by the processor when it communicates with the MIC. This signal is internally pulled up.

HARD—RESET. Also as shown in FIG. 2, this signal resets all registers and internal controls, including the uP status and control registers. This signal is active low. This signal is internally pulled up.

SCAN—ADDRESS. As is understood by those skilled in the art, scan mode is used to test semiconductor chips by driving in a bit pattern and checking for consistent results or "signatures" at the output of the chips. As shown in FIG. 2 as part of the TEST section, these two bits are used to select a scan path through the MIC and to enable or disable scan according to the scheme in Table VII below.

TABLE VII

| Address | Scan Address Description |
|---|---|
| 00 | scan enabled - scan path 0 selected |
| 01 | scan enabled - scan path 1 selected |
| 10 | scan enabled - scan path 2 selected |
| 11 | scan disabled |

SCAN—IN. Still referring to the TEST section shown in FIG. 2, this signal is the scan data input. It is internally pulled up.

Bi-directional Data Buses.

The following are the bi-directional data buses for the MIC as shown in FIG. 2.

PDATA is an 8-bit microprocessor data bus.

RED is a 6-bit red color memory data bus. This bus is internally pulled down.

GREEN is a 6-bit green color memory data bus explained in more detail below. This bus is internally pulled down.

BLUE is a 6-bit blue color memory data bus. This bus is internally pulled down.

Z is a 16-bit Z-buffer memory data bus which is explained in more detail below. This bus is internally pulled down.

K is a 3-bit K-buffer memory data bus. This bus is internally pulled down.

PRIORITY is a 2-bit priority buffer memory data bus. This bus is internally pulled down.

Outputs.

The following outputs from the MIC are best shown in FIG. 2.

HALT. When HALT is asserted, the stage preceding the MIC must halt until the MIC indicates it is ready for the next pixel. HALT is indicated with a high signal. This signal must go to all GIPPs.

EMPTY*. This bit is used to signify one of the following five modes:
 a. "CLEAR complete" where the three IBIT bits are low, the memory has been cleared.
 b. "BIST complete" wherein BIST has been completed.
 c. "IBIT—DATA complete" wherein BIST is low, and the memory has been tested.
 d. "IBIT—ADDR complete" wherein BIST and IBIT—DATA are low, and the memory has been tested.
 e. "Pipeline empty" which is indicated if BIST, IBIT—DATA, and IBIT—ADDR are low and there is no valid data in the MIC pipeline.

If any of the above conditions are met, the EMPTY* bit goes low. Once EMPTY* goes low, it shall return high under the following conditions:
 a. If HARD—RESET goes low.
 b. If EMPTY* represents BIST, IBIT—ADDR, or IBIT—DATA complete, EMPTY* returns high on the first uP read or write to the status or control registers.
 c. If EMPTY* represents CLEAR complete or pipeline empty, EMPTY* returns high as soon as a valid pixel is input into the pipeline.

During scan EMPTY* is forced high.

ADDRESS. In one embodiment this represents 22 bits which comprise the read and write address for the Z-buffer, RGB memory, K-buffer, and the Priority buffer. There are 11 bits each of X and Y as explained in detail hereinbelow.

During memory clear or memory test operations, addresses are generated internally. During normal operation, addresses are obtained from register R2, R3, or R7 of the pipeline as shown in FIG. 6. Registers R2 and R3 represent read addresses and register R7 represents write addresses.

WRITE—EN*. This is the memory write enable for the RGB memory, Z-buffer, K-buffer, and the Priority buffer. If the signal is low, the data associated with the WRITE* shall be written into memory.

REG—EN* This signal is used to enable the clock on the register on the output of the memory. This signal and a register with a clock enable must be used in the asynchronous mode. The signal is active low.

READ*. This bit is used to enable a memory output buffer so that memory data is input on the bi-directional memory interface. This signal is active low.

WRITE*. This bit is used to enable a memory input buffer so that data is output to the memory on the clocked interface. Required if the memory is common Input/Output (I/O). The WRITE* signal is active low.

SCAN—OUT. This is the scan output. This signal is tristated if scan is not enabled.

Pinout Description.

Table VIII shows the pinout totals of one illustrative embodiment of a MIC of the invention.

TABLE VIII

| Pinout | |
|---|---|
| INPUTS | 85 |
| BI-DIRECTIONAL | 47 |
| OUTPUTS | 29 |
| POWER | 10 |
| GROUND | 10 |

TABLE VIII-continued

| Pinout | |
|---|---|
| TOTAL | 181 |

As will be readily apparent to those skilled in the art, all applications employing the MIC do not require all pins to be connected. Table IX below lists an example of one application of the MIC requiring only 132 pinouts to be connected. Other applications requiring more or less pinouts are possible and will be apparent to those skilled in the art through reference to the detailed description and drawings herein.

TABLE IX

| INPUTS | | OUTPUTS | | BI-DIRECTIONAL | |
|---|---|---|---|---|---|
| X-ADDRESS | 10 | ADDRESS | 16 | RED | 4 |
| Y-ADDRESS | 10 | WRITE_EN* | 1 | GREEN | 4 |
| Z | 8 | READ* | 1 | BLUE | 4 |
| RED | 4 | HALT | 1 | Z | 8 |
| GREEN | 4 | REG_EN* | 1 | K | 3 |
| BLUE | 4 | EMPTY* | 1 | PDATA | 8 |
| K | 4 | SCAN_OUT | 1 | | 31 |
| POWER | 10 | | 22 | | |
| GROUND | 10 | | | | |
| CLOCK | 1 | | | | |
| DATA_VALID | 1 | | | | |
| CLEAR* | 1 | | | | |
| READ/WRITE* | 1 | | | | |
| PADDRESS | 4 | | | | |
| HOLD | 1 | | | | |
| OUTPUT_DIS | 1 | | | | |
| CHIP_SEL | 1 | | | | |
| HARD_RESET | 1 | | | | |
| SCAN_ADDRESS | 2 | | | | |
| SCAN_IN | 1 | | | | |
| | 79 | | | | |

Figure 11:
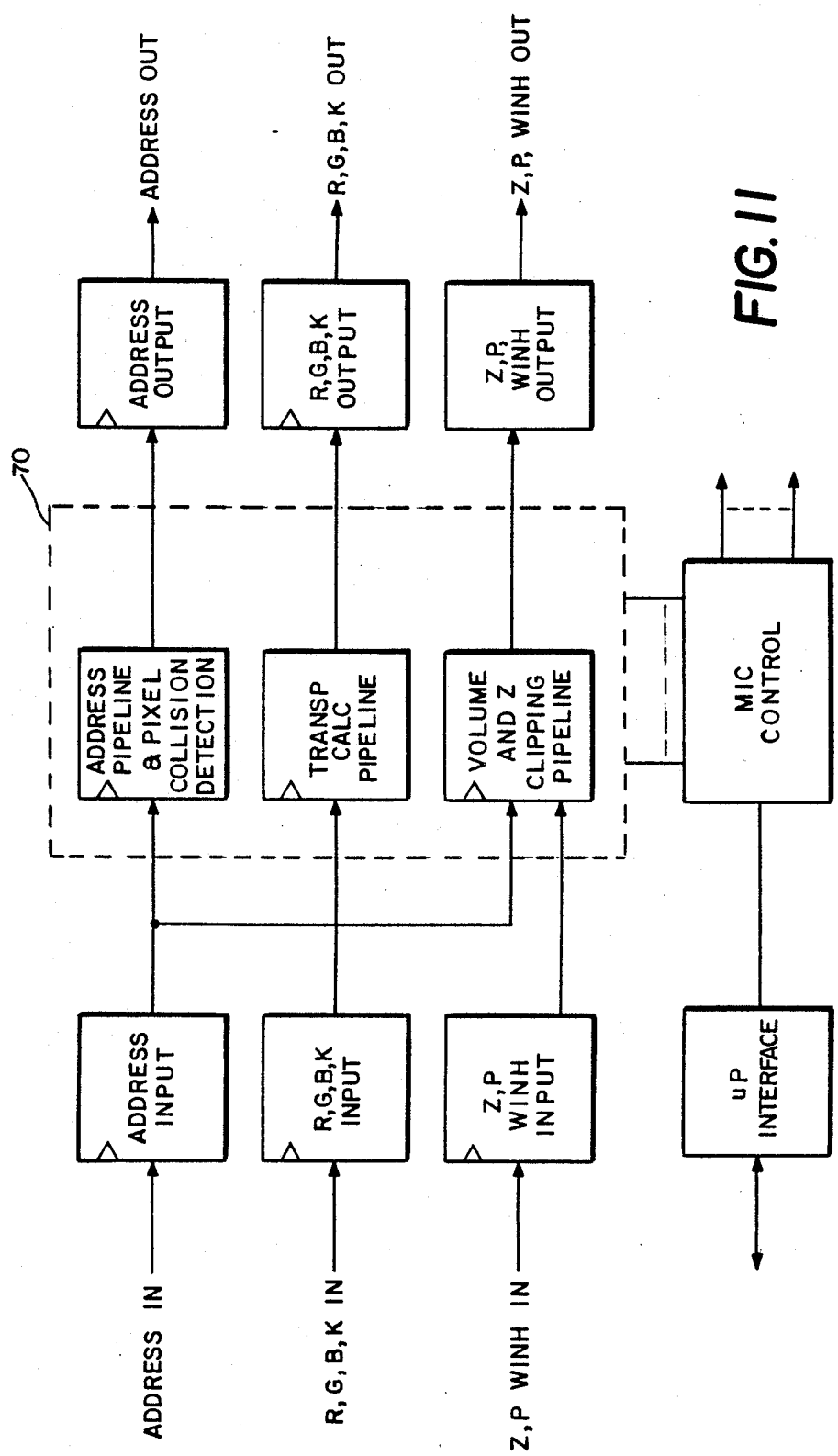
FIG. 11 shows schematically a block diagram of the architecture of the memory interface control of the invention.

Having described several of the input and output functions of the MIC, we now turn to an explanation of the operation of the invention as it relates to color display screen sizes. FIG. 11 gives a schematic overview of the MIC ARchitecture showing the MIC pipeline 70. FIG. 6 shows in detail a block diagram of the pipeline section 70 of the MIC. The first section of the data pipeline is the screen clip portion 30, registers R0 and R1. In operation, data is latched into register R0. This represents the incoming pixel from the GIPP. The X and Y address of the pixel is then used to determine if the pixel is in the viewable area of the screen according to the criteria listed in Table X. In one embodiment of the invention, the maximum size of the gaming area is 4096×4096 pixels. The maximum screen size is 2048×2048 pixels. If the pixel is not in the viewable area, the MIC inhibits the write for that pixel. If the pixel is in the viewable area, the Most Significant Bit (MSB) may require inversion to correctly address the memory. Table X also shows the inversion requirements. The Z-depth of a pixel is also used to determine if the pixel is viewable, thereby performing a volume clip. This test is shown below:

$$Z\_FOREGROUND <= PIXEL\_Z <= Z\_BACKGROUND$$

If the pixel is not in the X, Y range shown in Table X, the write to this pixel is inhibited. As discussed above, there are various display screen sizes, therefore, the viewable range is a function of the size of the gaming area.

TABLE X

| Viewable Range | | |
|---|---|---|
| SCREEN SIZE | VIEWABLE RANGE | INVERT |
| *Gaming Area Size 512 × 512* | | |
| 512 × 512 | 0 → 511 | NONE REQUIRED |
| 1024 × 1024 | 0 → 511 | NONE REQUIRED |
| 2048 × 2048 | 0 → 511 | NONE REQUIRED |
| 640 × 512 | 0 → 511 | NONE REQUIRED |
| *Gaming Area Size 1024 × 1024* | | |
| 512 × 512 | 256 → 767 | X_ADDR8, Y_ADDR8 |
| 1024 × 1024 | 0 → 1023 | NONE REQUIRED |
| 2048 × 2048 | 0 → 1023 | NONE REQUIRED |
| 640 × 512 | 192 → 831 | — |
| | 256 → 767 | Y_ADDR8 |
| *Gaming Area Size 2048 × 2048* | | |
| 512 × 512 | 768 → 1279 | X_ADDR8, Y_ADDR8 |
| 1024 × 1024 | 512 → 1535 | X_ADDR9, Y_ADDR9 |
| 2048 × 2048 | 0 → 2047 | NONE REQUIRED |
| 640 × 512 | 704 → 2343 | — |
| | 768 → 1279 | Y_ADDR8 |
| *Gaming Area Size 4096 × 4096* | | |
| 512 × 512 | 1792 → 2303 | X_ADDR8, Y_ADDR8 |
| 1024 × 1024 | 1536 → 2559 | X_ADDR9, Y_ADDR9 |
| 2048 × 2048 | 1024 → 3071 | X_ADDR10, Y_ADDR10 |
| 640 × 512 | 1728 → 2367 | — |

TABLE X-continued

| Viewable Range | | |
|---|---|---|
| SCREEN SIZE | VIEWABLE RANGE | INVERT |
| | 1792 → 2303 | Y_ADDR8 |

Table XI hereinbelow demonstrates visually a gaming area size of 4096×4096.

TABLE XI

Visual Description Example

| ADDRESS | A11 | A10 | A9 | A8 | A7 | A6 | A5 | A4 | A3 | A2 | A1 | A0 |
|---|---|---|---|---|---|---|---|---|---|---|---|---|
| 0 | 0 | 0 | 0 | 0 | 0 | 0 | 0 | 0 | 0 | 0 | 0 | 0 |
| 256 | 0 | 0 | 0 | 1 | 0 | 0 | 0 | 0 | 0 | 0 | 0 | 0 |
| 512 | 0 | 0 | 1 | 0 | 0 | 0 | 0 | 0 | 0 | 0 | 0 | 0 |
| 768 | 0 | 0 | 1 | 1 | 0 | 0 | 0 | 0 | 0 | 0 | 0 | 0 |
| 1024 | 0 | 1 | 0 | 0 | 0 | 0 | 0 | 0 | 0 | 0 | 0 | 0 |
| 1280 | 0 | 1 | 0 | 1 | 0 | 0 | 0 | 0 | 0 | 0 | 0 | 0 |
| 1536 | 0 | 1 | 1 | 0 | 0 | 0 | 0 | 0 | 0 | 0 | 0 | 0 |
| 1792 | 0 | 1 | 1 | 1 | 0 | 0 | 0 | 0 | 0 | 0 | 0 | 0 |
| 2048 | 1 | 0 | 0 | 0 | 0 | 0 | 0 | 0 | 0 | 0 | 0 | 0 |
| 2304 | 1 | 0 | 0 | 1 | 0 | 0 | 0 | 0 | 0 | 0 | 0 | 0 |
| 2560 | 1 | 0 | 1 | 0 | 0 | 0 | 0 | 0 | 0 | 0 | 0 | 0 |
| 2816 | 1 | 0 | 1 | 1 | 0 | 0 | 0 | 0 | 0 | 0 | 0 | 0 |
| 3072 | 1 | 1 | 0 | 0 | 0 | 0 | 0 | 0 | 0 | 0 | 0 | 0 |
| 3328 | 1 | 1 | 0 | 1 | 0 | 0 | 0 | 0 | 0 | 0 | 0 | 0 |
| 3584 | 1 | 1 | 1 | 0 | 0 | 0 | 0 | 0 | 0 | 0 | 0 | 0 |
| 3840 | 1 | 1 | 1 | 0 | 0 | 0 | 0 | 0 | 0 | 0 | 0 | 0 |
| 4095 | 1 | 1 | 1 | 1 | 0 | 0 | 0 | 0 | 0 | 0 | 0 | 0 |

Assume, for this example, that the above addresses represent "Y=values. As Table XI shows, it is only necessary to monitor the upper four bits of address on "Y" to determine if a pixel is in the viewable range since the smallest "Y" direction of a display screen as noted in the above tables is 512 pixels. If one looks at address 1792, for example, and the display is 512×512, the A8 bit would be inverted or changed to a "0". The memory for a 512×512 display is not connected to bits A11, A10 and A9, thus the system will output a "0" address to memory and the image will be translated to the display screen starting at the "0" pixel address location, usually the upper left hand corner of the screen.

If the MIC is operating asynchronously, it can read in a pixel on every clock cycle until it gets a pixel in the viewable area. Then, with some exceptions as stated herein, it may only read every other clock cycle. This allows for an increase of system throughput. If the MIC is operating synchronously, it only imports a new pixel to the pipeline every other clock cycle.

Finally, the screen clip section of the MIC rounds the incoming RGB from 8 bits to 6 bits of data for each pixel.

Incoming data is subject to the following special cases:

a. On a 512×512 display, the pixel clock is slow enough that a pixel could be read from memory on every clock. This allows memory boundaries to lie in the X direction. This means interpolation can be done in X. However, with higher resolution displays, this would not be true.

b. If a minimum of four pixels are to be read on every clock, then the memory boundaries must be the Y direction. If a MIC is being driven directly by a GIPP, the interpolation must take place in the Y direction.

Still referring to FIG. 6, the next section of the pipeline is the memory read section 32. It is advantageously comprised of registers R2, R3, R4, and R5A and R5B. At this stage of the pipeline, the data is simply being passed along until the corresponding data at the same X and Y address can be fetched from memory. In normal operation, data is fetched from memory every second clock cycle and is moved along in the pipeline at the same rate. One clock cycle is used to write data out to memory and the other is used to read memory. The synchronous mode always works in accordance with the aforedescribed scheme. The asynchronous mode may move data along at the clock speed provided that the pixel at the end of the pipeline does not need to be written, or does not need to be read because it is outside the viewable area.

Figure 10:
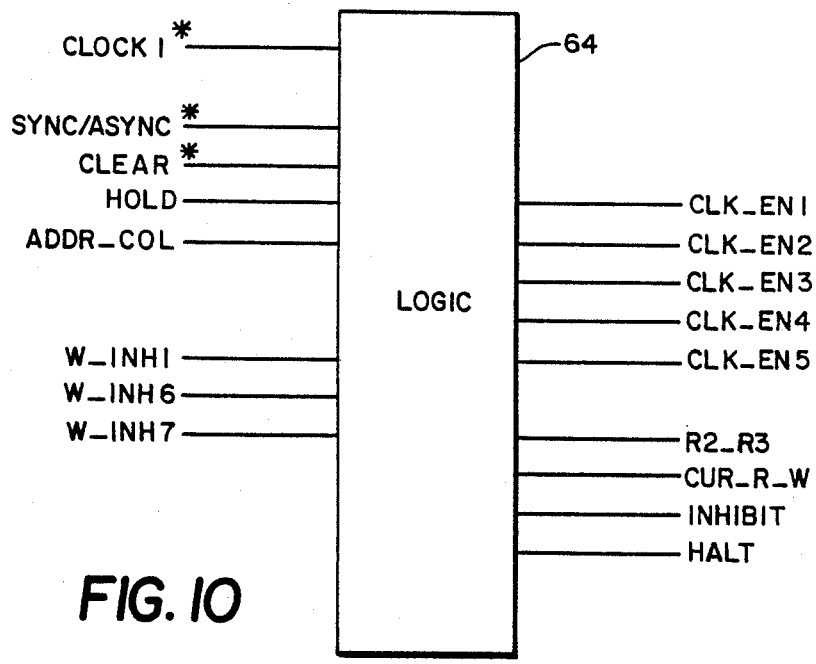
FIG. 10 is a block diagram of the Clock Control Section employed in one embodiment of the invention.

As described in further detail herein with reference to FIG. 10, a write inhibit signal at the output of register R3 is OR'ed with the INHIBIT signal. INHIBIT is an internally signal which is set when the state machine detects an address collision. The write inhibit bit flows through the pipeline with the rest of the data. At the input to the pipeline, this is called DATA VALID. If the data is valid at the input, this bit is set to a "0" in the example shown. If the pixel is outside of the viewable area, for example, the DATA VALID line will be set high, and the pixel will not be written into memory. This is to prevent the data from register 2 from inadvertently causing an address collision with itself in the pipeline.

Connected between Registers R4 and R5 is a 16 word by 10 bit ROM, which is the Look-Up Table (LUT) for K and (1−K). Because the step size from ⅛ to 1 is not the same as the step size with lower values of K, K should not be interpolated in this range.

It is important to note that the address and data must be registered at the memory input and that the data must be registered at the memory output in order for the data to be kept in alignment as it moves through the pipeline. The asynchronous mode requires the use of a register with a clock enable on the output of the memory.

The last section of the pipeline is the Z-buffering and the alpha channel calculation. It is assumed at this point that the screen clip portion 30 of the pipeline made a decision to write this pixel. The Z-buffer 36 checks to see if the pixel Z-depth is less than the Z-depth already in memory. If it is, this pixel is written to the memory. If the screen clip test result is not to write this pixel the Z-buffer test does not change that result. If the two Z-depths are exactly equal, then priority is checked. If the priority of the pixel is less than the priority of the data in memory, the pixel shall be written to the screen. In this way, the Z-depth can be expanded to 18 bits, if required. Also, if the incoming pixel is translucent, K<1, and the two Z-depths are equal, the pixel is written. In all other cases, the write is inhibited.

The alpha channel calculation is performed in two stages 38A and 28B. The first state 38A performs the following two calculations: K*L1, and (1−K)*L2. L1 is the 6 bit value of a specific of a pixel and L2 is the 8 bit value from memory. K is limited to the range of 0 to 1. Table XII shows K and its values and (1−K) and its values. The second state 38B adds the results of the calculations done in the first stage. Upon completion of the alpha calculation, the data is written to memory, provided that the write has not been inhibited at some stage of the pipeline.

TABLE XII

K and K-1 Values

| K | INTERNAL VALUE OF K | NUMERICAL VALUE OF K | INTERNAL VALUE OF 1 − K | NUMERICAL VALUE OF 1 − K |
|---|---|---|---|---|
| 0000 | 0.0000 | 0 | 1.0000 | 1 |
| 0001 | 0.0001 | 1/16 | 0.1111 | 15/16 |
| 0010 | 0.0010 | ⅛ | 0.1110 | ⅞ |
| 0011 | 0.0011 | 3/16 | 0.1101 | 13/16 |
| 0100 | 0.0100 | ¼ | 0.1100 | ¾ |
| 0101 | 0.0101 | 5/16 | 0.1011 | 11/16 |
| 0110 | 0.0110 | ⅜ | 0.1010 | ⅝ |
| 0111 | 0.0111 | 7/16 | 0.1001 | 9/16 |
| 1000 | 0.1000 | ½ | 0.1000 | ½ |
| 1001 | 0.1001 | 9/16 | 0.0111 | 7/16 |
| 1010 | 0.1010 | ⅝ | 0.0110 | ⅜ |
| 1011 | 0.1011 | 11/16 | 0.0101 | 5/16 |
| 1100 | 0.1100 | ¾ | 0.0100 | ¼ |
| 1101 | 0.1101 | 13/16 | 0.0011 | 3/16 |
| 1110 | 0.1110 | ⅞ | 0.0010 | ⅛ |
| 1111 | 1.0000 | 1 | 0.0000 | 0 |

Having described the operation of the alpha channel calculations, the mathematical basis for the calculations is now described to aid in the understanding of the invention. Let the primed values represent the pixel from memory and the unprimed values represent corresponding pixel in the pipeline of the chip. Every time a pixel is written, the K value must be modified by the following equation:

$$K = 1 - (1-K)*(1-K').$$

There are four bits on the input and only three bits on the output, with only five levels used. The equation for K shown above is quantized as shown in Table XIII.

TABLE XIII

| K | K Quantization VALUE | RANGE |
|---|---|---|
| 000 | 0 | 0 |
| 001 | ¼ | 1/16 ≦ K < ⅜ |
| 010 | ½ | ⅜ ≦ K < ⅝ |
| 011 | ¾ | ⅝ ≦ K ≦ 1 |
| 100 | 1 | K = 1 |

The transparency equation is performed as follows. If the pixel in the pipeline is in front of the pixel in memory, the pixel color is modified by the following equation:

$$COLOR = K*COLOR + (1-K)*COLOR'.$$

If the pixel in memory is in front of the pixel in the pipeline, the pixel color in a prior art design normally would be modified by the following equation:

$$COLOR = K'*COLOR' + (1-K')*COLOR \qquad (A)$$

There are four conditions which this equation covers:

Condition 1. Both pixels are solid, i.e. $K = K' = 1$. In this condition, the write is inhibited because the pixel in memory is solid (not translucent), in front of the pipeline pixel.

Condition 2. The pixel in memory is solid, $K' = 1$, and the pipeline pixel is translucent, $0 = K1$. The write is inhibited for the same reasons as Condition 1.

Condition 3. The pixel in the pipeline is solid, $K = 1$, and the pixel in memory is translucent, $0 = K'1$. The write is inhibited because the display is to be built by processing all solid objects first then translucent objects.

Condition 4. Both pixels are translucent, $0 = K, K'1$. The write is inhibited because translucent objects must be processed back to front. This is due to the fact that the transparency equation gives improper results processed any other way.

As can be appreciated by those skilled in the art, write is inhibited in each of the four conditions. This is due to the following convention adopted in this embodiment of the invention to implement translucency. Namely, the pixels are processed back-to-front after all solid pixels have been processed. As a result equation (A) does not need to be implemented in the chip, thereby simplifying the design.

Outside of the mainstream of the pipeline, but still a part of it, is the Address Collision Test 40. This test compares X and Y addresses at registers R3, R4, R5, and R6 against the address in Register R2. If any one of the addresses matches the address in register R2, the clock enables to registers R1 through R3 and must be halted until the data in the pipeline is flushed out. Also, the GIPP (or GIPPs if more than one is in use) must be halted, otherwise data will be lost at the input to the MIC.

If the MIC is in IBIT_DATA mode, it sequentially cycles through all the memory and fill it with the BACKGROUND. Upon completion, it again cycles through all memory reading the data back. If the CLEAR* signal is low, the MIC chip shall cycle through all memory and fill it with the BACKGROUND, provided memory clear is enabled.

If the MIC is in IBIT_ADDR mode, it shall sequentially cycle through all the memory and fill it with addresses. Upon completion, it again cycles through all memory reading the addresses back.

uP Control Section.

The uP Control Section comprises two control registers, the background, and status registers. The control registers and background registers are described above. The status registers contain the results of the various BIT functions. During IBIT_DATA, the MIC shall load background into all of memory and then read the data back in and compare that data against the background. The MIC chip then checks for failed data bits.

Figure 7:
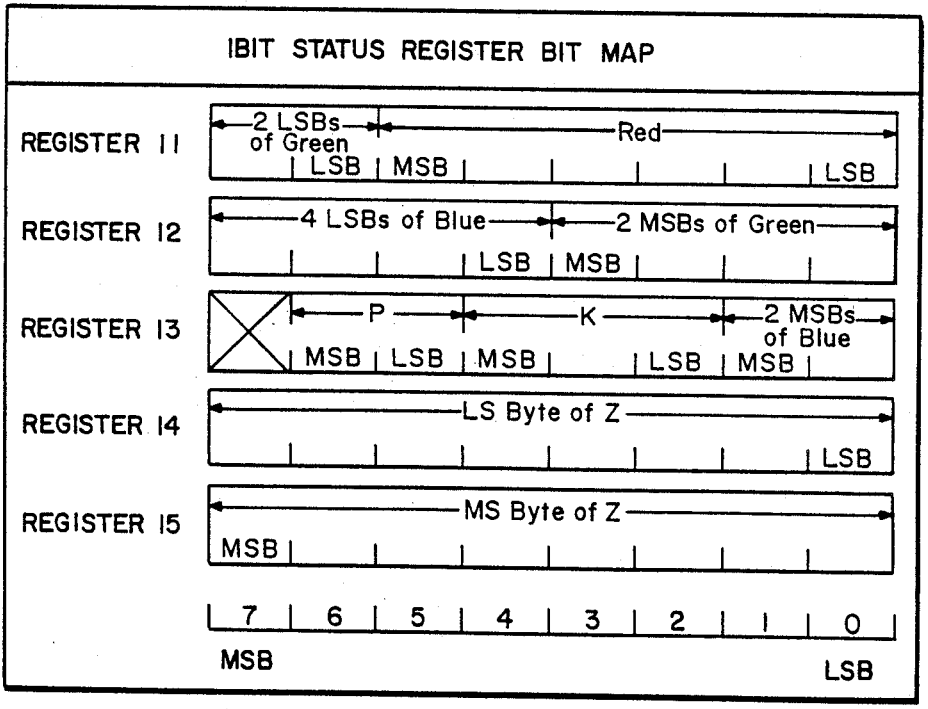
FIG. 7 schematically shows the status register organization for IBIT, a test portion of the invention.

The status registers for IBIT are organized as shown in FIG. 7. The control registers, the background, and status registers are all reset during a HARD_RESET. During normal operation, registers 11 to 15 are reset at the start of IBIT_ADDR and IBIT_DATA. The BIST status register (register 10) contains the MIC signature value when BIST is complete. As those skilled in the art will appreciate, this value is dependent upon the specific embodiment of the MIC and the type of built-in self-test used. This is described in more detail below. It is reset at the start of BIST.

uP Input Control Section.

The uP Interface Control shown in FIG. 2 generates all control signals to load a register or read a register based on address. In order to read or write a register, the Chip Select, "CHIP_SEL*, must be low, a valid address must be present and the read/write signal, "READ/WRITE*", must be in the proper state.

In one embodiment of the invention, the uP Input Control Section essentially comprises a 16 byte multiplexer and a 10 byte demultiplexer. The PADDRESS lines are used for decoding. If CHIP_SEL* is high, then the demultiplexer outputs must be set in such a state that nothing is selected. If CHIP_SEL* is low, and READ/WRITE* is high, a control or status register on the 16 byte multiplexer 52 is selected (i.e. one of the control/status registers). If READ/WRITE* is low, then a register on the 10 byte demultiplexer is selected (i.e. data is written to one of the control registers). Data is latched when CHIP SEL goes high.

Figure 8:
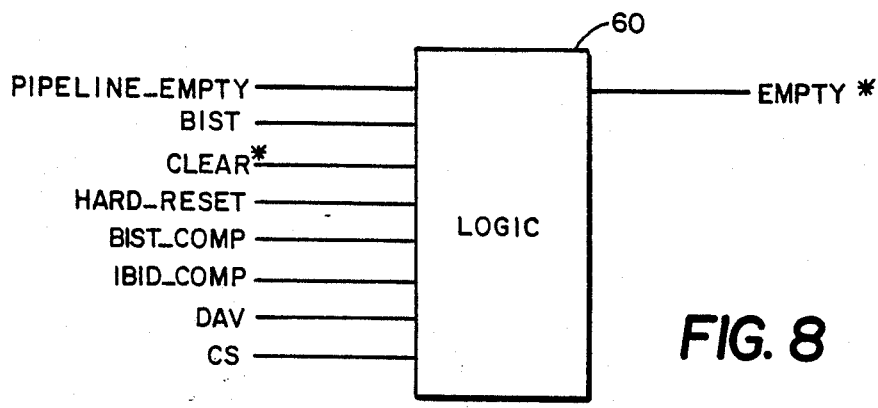
FIG. 8 is a block diagram of the Clear Section employed in one embodiment of the invention.

FIG. 8 schematically shows a block diagram of the MIC Clear Section. The logic 60 is designed using well-known logic techniques to carry out the logical relationships between EMPTY* and the other inputs shown in FIG. 12 as defined above.

Figure 9:
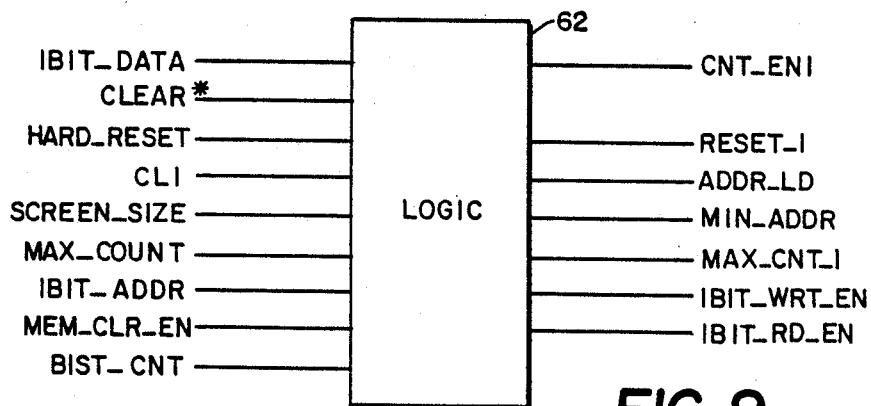
FIG. 9, is a block diagram of the IBIT Control Section used in one embodiment of the invention.

FIG. 9 schematically shows a block diagram of one embodiment of the IBIT control section of the invention. This section contains the Address counter, used to address memory during IBIT modes or CLEAR, and IBIT control. This section presents the address counter based on the screen size. The counter is preset every time an IBIT mode is commanded or when CLEAR is commanded. The address counter is cleared when IBIT is deselected or when clear is complete. The other counters are reset when IBIT is deselected.

The CNT_EN1, RESET1, ADDR_LD, and MIN_ADDR signals are used to control the address generator in the Data Pipeline section. RESET2 resets the status registers.

There are two modes of operation in this section: IBIT (DATA or ADDRESS) and CLEAR. When one of the IBIT bits is set high or CLEAR is low, the address counter is preset with an address. This address is a function of MAX_COUNT. It is assumed the minimum memory bank size is 32K. This means the lower 14 bits of the counter shall always be preset to 0. Therefore, only bits 14-21 are ever set to a non-zero value. Table XIV describes which bits are set to 0 or 1 based on Screen Size and the amount of memory to clear. If TEST is high, all the counters count as four bit counters. This allows the counters to be tested in 16 clock cycles. Scan is also implemented in the counters. VLSI logic 62 is designed using well-known logic techniques to implement the above-described logical relationships.

TABLE XIV

| SCREEN SIZE | MAX COUNT | TOTAL SIZE | ONE'S | ZERO'S |
|---|---|---|---|---|
| 512 × 512 | 000 | 256K | 21 - 18 | 17 - 0 |
|  | 001 | 128K | 21 - 17 | 16 - 0 |
|  | 010 | 64K | 21 - 16 | 15 - 0 |
|  | 011 | 32K | 21 - 15 | 14 - 0 |
| 1024 × 1024 | 000 | 1M | 21 - 20 | 19 - 0 |
|  | 001 | 512K | 21 - 19 | 18 - 0 |
|  | 010 | 256K | 21 - 18 | 17 - 0 |
|  | 011 | 128K | 21 - 17 | 16 - 0 |
|  | 100 | 64K | 21 - 16 | 15 - 0 |
|  | 101 | 32K | 21 - 15 | 14 - 0 |
| 2048 × 2048 | 000 | 4M | — | 22 - 0 |
|  | 001 | 2M | 21 | 20 - 0 |
|  | 010 | 1M | 21 - 20 | 19 - 0 |
|  | 011 | 512K | 21 - 19 | 18 - 0 |
|  | 100 | 256K | 21 - 18 | 17 - 0 |
|  | 101 | 128K | 21 - 17 | 16 - 0 |
|  | 110 | 64K | 21 - 16 | 15 - 0 |
|  | 111 | 32K | 21 - 15 | 14 - 0 |
| 640 × 512 | 000 | 320K | 21 - 19,17,16 | 18,15 - 0 |
|  | 001 | 160K | 21 - 18,16,15 | 17,14 - 0 |
|  | 010 | 80K | 21 - 17,15,14 | 16,13 - 0 |
|  | 011 | 64K | 21 - 16 | 15 - 0 |
|  | 100 | 32K | 21 - 15 | 14 - 0 |

TABLE XIV-continued

| SCREEN SIZE | MAX COUNT | TOTAL SIZE | ONE'S | ZERO'S |
|---|---|---|---|---|
|  | 100 | 32K | 21 - 15 | 14 - 0 |

When IBIT is set high, the counter is preset. When it reaches its maximum counter, it is preset again so the counter runs a second time. The first time is to fill the memory and the second time is to read and compare.

FIG. 10 is a block diagram of the Clock Control section of the invention. The clock circuitry 64 is designed to minimize clock skew. For best results, the clock skew within the MIC must not exceed 2 ns.

The W_INH1 (write inhibit for register R1) signal comes from the Screen Clip section. If the pixel being operated on in that section is not to be written to the screen, this signal is used to indicate that decision to the Clock Control section. This allows the Clock Control section to read another pixel while performing another write to memory (if it is required).

The W_INH6 (write inhibit for register R6) and W_INH7 (write inhibit for register R7) signals come from the Z and Priority test section. They indicate the pixel in that section is not be written to the screen if it is behind data already in memory. If this occurs, the MIC can then perform back to back reads from memory provided that the incoming pixels are in the viewable area. In the event where the incoming pixel is not in the viewable area and the pixel in the Z and Priority test section are not to be written, a read cycle is performed.

Using the asynchronous mode allows a higher effective throughput rate. This is due to the fact that as polygons are rendered, surfaces behind surfaces already rendered do not require read-modify-write cycles, but read cycles only. If it is assumed that half the polygons fit into this category then throughput is increased by a factor of 1.5 over the synchronous mode. Maximum throughput in the synchronous case is 12.5 Mpixels/sec. Under the above assumption, throughput could be increased to 18.75 Mpixels/sec., on the average.

One bit is used to indicate an address collision. An address collision means that the X,Y address in register R2 of the pipeline is the same as the X,Y address in register R3, R4, R5, or R6 as shown in FIG. 6. The pipeline must then be cleared out before the pixel in register R2 can be fetched from memory. CLK_EN1 must be disabled immediately until the pipeline is emptied. Once an address collision has occurred, the MIC performs write cycles only until the pipeline is empty, then HALT is de-asserted and CLK_EN1 is enabled. Once an address collision has occurred, any subsequent collisions detected are ignored until the pipeline is flushed.

A signal designated CL1 represents the internal clock used throughout the MIC. The routing of this signal must be such that clock skewing is minimized. This signal needs strong drive capability because this clock is routed to every stage of the MIC and D Flip Flops (DFFs) are attached to it. The basic philosophy of the clock control state machine design is that all inputs and outputs are registered. All outputs for the next state are determined during the current clock cycle. This means that the effect of any input to the state machine shows up one clock cycle later on the output.

For the synchronous mode of operation, CLK_EN1 goes high every other clock cycle. A high indicates that the clock is enabled. All of the other clock enables are essentially delayed versions of CLK_EN1. CLK_EN2 is one cycle delayed, CLK_EN3 and CLK_EN4 are two cycles delayed and CLK_EN5 is high CUR_R_W is low. This indicates a read cycle. HALT is the inverted CLK_EN1 signal. If HOLD is asserted at the state machine inputs (this is one clock cycle after it is asserted external to the part, as this signal must be synchronized) during a write cycle all clock enables are disabled on the next clock cycle, and REG_EN* goes high. On exit from HOLD a read cycle is executed, to pull in the data on the memory output register. The state machine is then back into normal mode. If HOLD is asserted during a read cycle, CLK_EN2 and CLK_EN5 must be asserted during the first cycle of the HOLD so that there is no loss of data. The MIC then switches to a write cycle and REG_EN* is high as in the previous case.

Generally, when an address collision occurs, CLK_EN1 stops while the remainder of the pipeline is flushed. When the pipeline is flushed (i.e., register R6 has invalid data), the MIC returns to normal operation. HOLD can be asserted during an address collision with no loss of data. It is important to note that if HOLD or asynchronous mode is to be used, a register with clock enable must be used on the memory output. Otherwise, data may be lost. The asynchronous mode of operation functions identically to the synchronous mode, except that if a pixel is screen clipped to Z-clipped, CLK_EN1 runs on every clock cycle.

Figure 12:
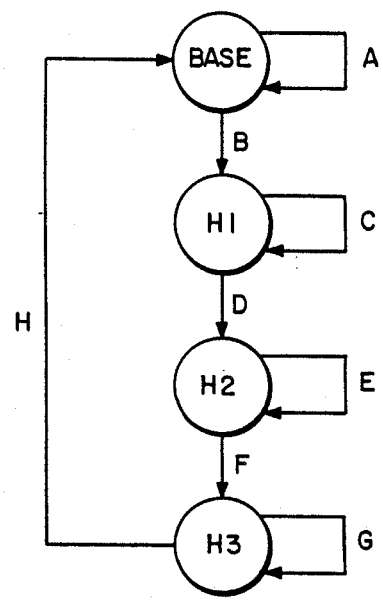
FIG. 12 is a state diagram of the MIC in the synchronous mode of operation.

For further understanding of the operation of the MIC in the synchronous mode, refer to FIG. 12 which is a state diagram of the synchronous mode of operation. In the synchronous mode of operation, the MIC has four states, base, H1, H2 and H3. The MIC transitions between these states on paths A through H. Transitions are made according to the synchronous state transition table shown below as Table XV.

TABLE XV

| | | SYNCHRONOUS STATE TRANSITION | | | |
|---|---|---|---|---|---|
| PATH | TRANSITION FROM STATE TO STATE | INPUT CONDITIONS | OUTPUTS GOING LOW ON THE CLOCK | OUTPUTS GOING HIGH ON THE CLOCK | STATE OF CUR_R_W ON CLOCK |
| A | BASE-BASE | HALT1=HOLD=0; CUR_R_W=R OR HOLD=1; CUR_R_W=R; HALT1=0 | CLK_EN1; CLK_EN3; CLK_EN4; R2_R3; REG_EN; INHIBIT | CLK-EN2; CLK-EN5 | W |
| | | HALT1=HOLD=0; CUR_R_W=W | CLK_EN2; CLK_EN3; R2_R3; REG_EN; INHIBIT | CLK_EN1; CLK_EN3; CLK_EN4 | R |
| | | HOLD=1; CUR_R_W=W | CLK_EN1; CLK_EN2; CLK_EN3; CLK_EN4; CLK_EN5; INHIBIT; R2_R3 | REG_EN | W |
| B | BASE-H1 | HALT1=1; CUR_R_W=W | CLK_EN1; CLK_EN5; R2_R3; REG_EN | CLK_EN2; CLK_EN3; CLK_EN4; INHIBIT | R |
| C | H1-H1 | HOLD=1 | CLK_EN1; CLK_EN2; CLK_EN3; CLK_EN4; CLK_EN5; INHIBIT; R2_R3; REG_EN | | R |
| D | H1-H2 | HOLD=0 | CLK_EN1; CLK_EN2; CLK_EN4; INHIBIT; R2_R3; REG_EN | CLK_EN3; CLK_EN5 | W |
| E | H2-H2 | HOLD=1 | CLK_EN1; CLK_EN2; CLK_EN3; CLK_EN4; CLK_EN5; INHIBIT; R2_R3; REG-EN | | W |
| F | H2-H3 | HOLD=0 | CLK_EN1; CLK_EN2; CLK_EN3; CLK_EN4; INHIBIT; R2_R3; REG_EN | CLK_EN5 | W |
| G | H3-H3 | HOLD=1 | CLK_EN1; CLK_EN2; CLK_EN3; CLK_EN4; CLK_EN5; INHIBIT; R2_R3; REG_EN | | W |
| | | HOLD=0; W_INH_R6=0 | CLK_EN1; CLK_EN2; CLK_EN3; CLK_EN4; INHIBIT; R2_R3; REG_EN | CLK_EN5 | W |
| H | H3-BASE | HOLD=0; W_INH_R6=1 | CLK_EN2; CLK_EN5; INHIBIT; R2_R3; REG_EN | CLK_EN1; CLK_EN3; CLK_EN4 | R |

Figure 13:
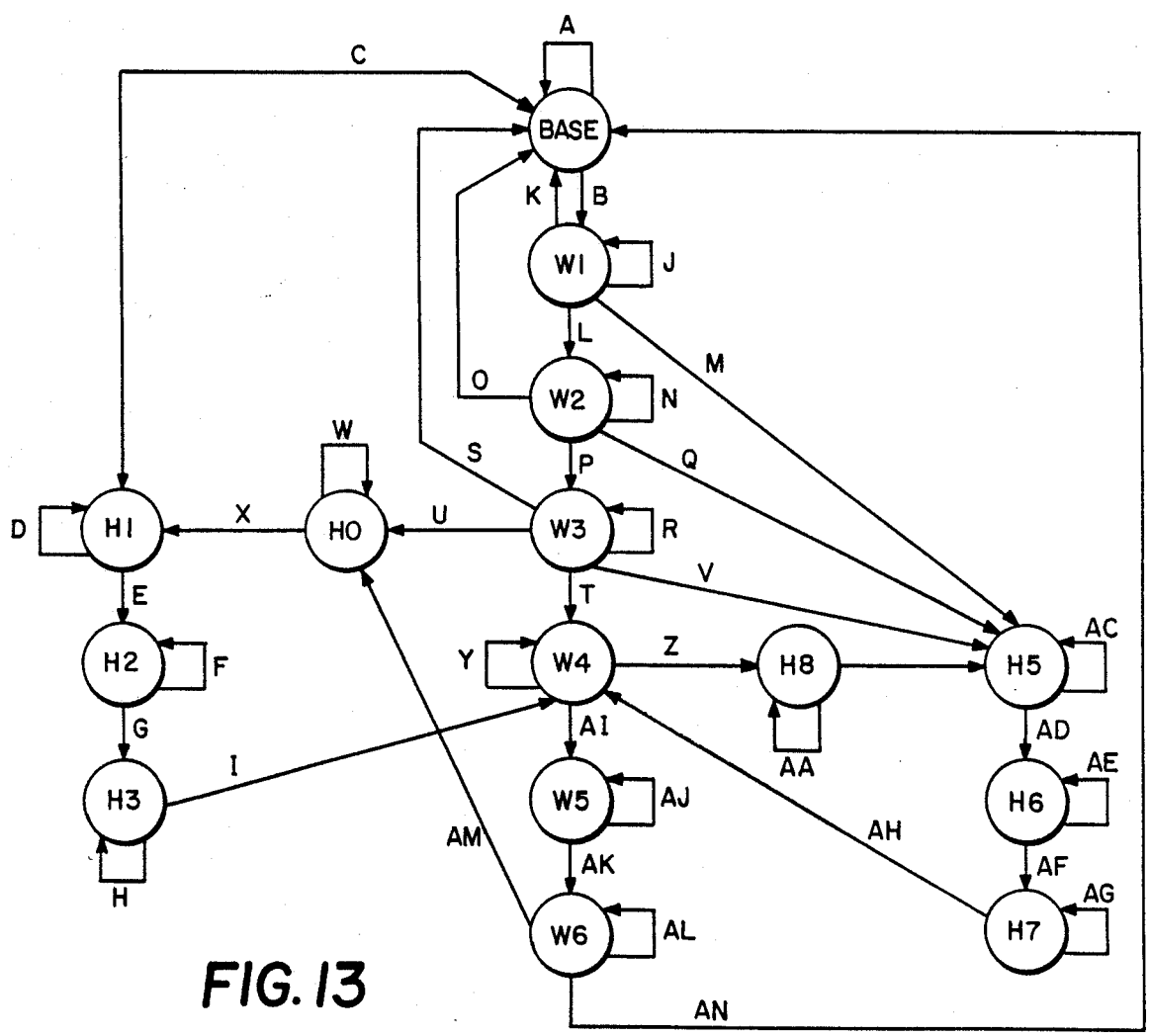
FIG. 13 is a state diagram of the MIC in the asynchronous mode of operation.

With respect to the asynchronous mode, the MIC state diagram is shown in FIG. 13. The various states are transitioned according to asynchronous state transition Table XVI hereinbelow.

TABLE XVI

ASYNCHRONOUS STATE TRANSITION

| PATH | TRANSITION FROM STATE TO STATE | INPUT CONDITIONS | OUTPUTS GOING LOW ON THE CLOCK | OUTPUTS GOING HIGH ON THE CLOCK | STATE OF CUR_R_W ON CLOCK |
|---|---|---|---|---|---|
| A | BASE-BASE | HOLD=0; HALT1=0; W_INH_R1=0; (W_INH_R6 & W_INH_R7)≠1; CUR_R_W=W | CLK_EN2; CLK_EN5; INHIBIT; R2_R3; REG_EN | CLK_EN1; CLK_EN3; CLK_EN4 | R |
| | | HOLD=0; HALT1=0; W_INH_R1=0; (W_INH_R6 & W_INH_R7)≠1; CUR_R_W=R | CLK_EN1; CLK_EN3; INHIBIT; R2_R3; REG_EN; CLK_EN4 | CLK_EN2; CLK_EN5; | W |
| | | HOLD=1; HALT=0; W_INH_R1=0; (W_INH_R6 & W_INH_R7)≠1; CUR_R_W=W | CLK_EN1; CLK_EN2; CLK_EN3; CLK_EN4; CLK_EN5; INHIBIT; R2_R3 | REG_EN; | W |
| | | HOLD=1; HALT1=0; W_INH_R1=0; (W_INH_R6 & W_INH_R7)≠1; CUR_R_W=R | CLK_EN1; CLK_EN3; CLK_EN4; INHIBIT; R2_R3; REG_EN | CLK_EN2; CLK_EN5; | W |
| | | HOLD=0; HALT1=0; W_INH_R1=1; (W_INH_R6 & W_INH_R7)≠1; CUR_R_W=W | CLK_EN2; CLK_EN5; INHIBIT; R2_R3; REG_EN; | CLK_EN1; CLK_EN3; CLK_EN4 | R |
| | | HOLD=0; HALT1=0; W_INH_R1=1; (W_INH_R6 & W_INH_R7)≠1; CUR_R_W=R | CLK_EN3; CLK_EN4; INHIBIT; R2_R3; REG_EN; | CLK_EN1; CLK_EN2; CLK-EN5 | W |
| B | BASE-W1 | HOLD=0; HALT1=0; (W_INH_R6 & W_INH_R7)=1; CUR_R_W=R | CLK_EN3; CLK_EN4; INHIBIT; R2_R3; REG_EN; | CLK_EN1; CLK_EN2; CLK-EN5 | R |
| C | BASE-H1 | HALT1=1 | CLK_EN1; CLK_EN5; R2_R3; REG_EN | CLK_EN2; CLK_EN3; CLK-EN4; INHIBIT | R |
| D | H1-H1 | HOLD=1 | CLK_EN1; CLK_EN2; CLK_EN3; CLK_EN4; CLK_EN5; INHIBIT; R2_R3; REG_EN | | R |
| E | H1-H2 | HOLD=0 | CLK_EN1; CLK_EN2; CLK_EN4; INHIBIT; R2_R3; REG_EN | CLK_EN3; CLK_EN5 | W |
| F | H2-H2 | HOLD=1 | CLK_EN1; CLK_EN2; CLK-EN3; CLK_EN4; CLK_EN5; INHIBIT; R2_R3; REG_EN | | W |
| G | H2-H3 | HOLD=0 | CLK_EN1; CLK_EN2; CLK_EN3; CLK_EN4; INHIBIT; R2_R3; REG_EN | CLK_EN5 | W |
| H | H3-H3 | HOLD=1 CUR_R_W=W | CLK_EN1; CLK_EN2; CLK_EN3; CLK-EN4; CLK-EN5; INHIBIT; R2_R3; REG_EN | | W |
| | | HOLD=0; CUR_R_W=W; | CLK_EN1; CLK_EN2; | CLK_EN5 | W |

TABLE XVI-continued

ASYNCHRONOUS STATE TRANSITION

| PATH | TRANSITION FROM STATE TO STATE | INPUT CONDITIONS | OUTPUTS GOING LOW ON THE CLOCK | OUTPUTS GOING HIGH ON THE CLOCK | STATE OF CUR_R_W ON CLOCK |
|---|---|---|---|---|---|
| | | W_INH_R6=1 | CLK-EN3; CLK-EN4; INHIBIT; R2_R3; REG_EN | | |
| | | HOLD=0; CUR_R_W=W; W_INH_R6=1 | CLK_EN3; CLK_EN4; INHIBIT; R2_R3; REG_EN | CLK_EN1; CLK_EN2; CLK_EN5 | R |
| | | HOLD=1; CUR_R_W=R | CLK_EN1; CLK_EN2; CLK_EN3; CLK_EN4; CLK_EN5; INHIBIT; R2_R3; REG_EN | | R |
| I | H3-W4 | HOLD=0 CUR_R_W=R | INHIBIT; R2_R3; REG_EN | CLK_EN1; CLK_EN2; CLK_EN3; CLK_EN4; CLK_EN5 | R |
| J | W1-W1 | HOLD=1 & CLK_EN=1; HALT1=0 | CLK_EN1; CLK_EN5; INHIBIT; R2_R3; REG_EN | CLK_EN2; CLK_EN3; CLK_EN4 | R |
| | | HOLD=1 & CLK_EN1=0 HALT1=0 | INHIBIT; R2_R3 | CLK_EN1; CLK_EN2; CLK_EN3; CLK_EN4; CLK_EN5; REG_EN | R |
| K | W1-BASE | HOLD=0; W_INH_R6=0 HALT1=0 | CLK_EN2; INHIBIT; R2_R3; REG_EN | CLK_EN1; CLK_EN3; CLK_EN4; CLK_EN5 | R |
| L | W1-W2 | HOLD=0 W_INH_R6=1 HALT1=0 | CLK_EN5 | CLK_EN1; CLK_EN2; CLK_EN3; CLK_EN4 | R |
| M | W1-H5 | HALT=1 | CLK_EN1; CLK_EN5; R2_R3; REG_EN | CLK_EN2; CLK_EN3; CLK_EN4; INHIBIT | R |
| N | W2-W2 | HOLD=1; HALT1=0 CLK_EN1=1 | CLK_EN1 | CLK_EN2; CLK_EN3; CLK_EN4; CLK_EN5; INHIBIT; R2-R2; REG_EN | R |
| | | HOLD=1; HALT1=0 CLK_EN1=0 | REG_EN | CLK_EN1; CLK_EN2; CLK_EN3; CLK_EN4; CLK_EN5; INHIBIT; R2_R3 | R |
| O | W2-BASE | HOLD=0; HALT1=0; W_INH_R6=0; W_INH_R7=0 | REG_EN; CLK_EN5 | CLK_EN1; CLK_EN2; CLK_EN3; CLK_EN4; INHIBIT; R2_R3 | W |
| P | W2-W3 | HOLD=0; HALT1=0; W_INH_R7=1 | INHIBIT; R2_R3; REG_EN | CLK_EN1; CLK_EN2; CLK_EN3; CLK_EN4; CLK_EN5 | R |
| Q | W2-H5 | HALT1=1 | CLK_EN1; R2_R3; REG_EN | CLK_EN2; CLK_EN3; CLK_EN4; CLK_EN5; INHIBIT | R |
| R | W3-W3 | HALT1=0; HOLD=1; CLK_EN1 | CLK_EN1; INHIBIT; R2_R3; REG_EN | CLK_EN2; CLK_EN3; CLK_EN4; CLK_EN5 | R |

TABLE XVI-continued

ASYNCHRONOUS STATE TRANSITION

| PATH | TRANSITION FROM STATE TO STATE | INPUT CONDITIONS | OUTPUTS GOING LOW ON THE CLOCK | OUTPUTS GOING HIGH ON THE CLOCK | STATE OF CUR_R_W ON CLOCK |
|---|---|---|---|---|---|
|  |  | HALT1=0; HOLD=1; CLK_EN1=0 | CLK_EN1; CLK_EN2; CLK_EN3; CLK_EN4; CLK_EN5; INHIBIT; R2_R3 | REG_EN | R |
| S | W3-BASE | HALT1=0; HOLD=0; W_INH_R6=0 | CLK_EN5; REG_EN | CLK_EN1; CLK_EN2; CLK_EN3; CLK_EN4 | W |
| T | W3-W4 | HALT1=0; HOLD=0; W_INH_R6=1; W_INH_R7=1 | INHIBIT; R2_R3 REG_EN | CLK_EN1; CLK_EN2; CLK_EN3; CLK_EN4; CLK_EN5 | R |
| U | W3-H0 | HALT1=1; W_INH_R6=0 | CLK_EN5; REG_EN | CLK_EN1; CLK_EN2; CLK_EN3; CLK_EN4; INHIBIT; R2_R3 | W |
| V | W3-H5 | HALT1=1; W_INH_R6=0 | CLK_EN1; R2_R3; REG_EN | CLK_EN2; CLK_EN3; CLK_EN4; CLK_EN5; INHIBIT; | R |
| W | H0-H0 | HOLD=1 | CLK_EN1; CLK_EN2; CLK_EN3; CLK_EN4; CLK_EN5; INHIBIT; R2_R3 | REG_EN | R |
| X | H0-H1 | HOLD=0 | CLK_EN1; CLK_EN5; R2_R3 REG_EN | CLK_EN2; CLK_EN3; CLK_EN4; INHIBIT; | R |
| Y | W4-W4 | HALT1=0; HOLD=0; W_INH_R6=1; W_INH_R7=1 | REG_EN; R2_R3 INHIBIT | CLK_EN1; CLK_EN2; CLK_EN3; CLK_EN4; CLK_EN5 | R |
|  |  | HALT1=0; HOLD=1; CLK_EN1=1 | CLK_EN1; INHIBIT; R2_R3; REG_EN | CLK_EN2; CLK_EN3; CLK_EN4; CLK_EN5 | R |
|  |  | HALT1=0; HOLD=1; CLK_EN1=0 | CLK_EN1; CLK_EN2; CLK_EN3; CLK_EN4; CLK_EN5; INHIBIT; R2_R3; REG_EN |  | R |
| Z | W4-H8 | HALT1=1 | CLK_EN1; CLK_EN4; R2_R3 | CLK_EN2; CLK_EN3; CLK_EN5; INHIBIT; REG_EN | W |
| AA | H8-H8 | HOLD=1 | CLK_EN1; CLK_EN2; CLK_EN3; CLK_EN4; CLK_EN5; INHIBIT; R2_R3 | REG_EN | R |
| AB | H8-H5 | HOLD=0 | CLK_EN1; CLK_EN2; CLK_EN3; CLK_EN5; INHIBIT; R2_R3 REG_EN | CLK_EN4 | R |
| AC | H5-H5 | HOLD=1 | CLK_EN1; INHIBIT; R2_R3; REG_EN | CLK_EN2; CLK_EN3; CLK_EN4; CLK_EN5 | R |
| AD | H5-H6 | HOLD=0 | CLK_EN1; CLK_EN2; INHIBIT: R2_R3; REG_EN | CLK_EN3; CLK_EN4; CLK_EN5; | W |
| AE | H6-H6 | HOLD=1 | CLK_EN1; CLK_EN2; CLK_EN3; CLK_EN4; CLK_EN5; INHIBIT; R2_R3; REG_EN |  | W |
| AF | H6-H7 | HOLD=0 | CLK_EN1; CLK_EN2; CLK_EN3; CLK_EN4; | CLK_EN5 | W |

TABLE XVI-continued

ASYNCHRONOUS STATE TRANSITION

| PATH | TRANSITION FROM STATE TO STATE | INPUT CONDITIONS | OUTPUTS GOING LOW ON THE CLOCK | OUTPUTS GOING HIGH ON THE CLOCK | STATE OF CUR_R_W ON CLOCK |
|---|---|---|---|---|---|
| AG | H7-H7 | HOLD=1; CUR_R_W=W | INHIBIT; R2_R3; REG_EN CLK_EN1; CLK_EN2; CLK_EN3; CLK_EN4; CLK_EN5; INHIBIT; R2_R3; REG_EN | | R |
| | | HOLD=0; W_INH_R6=0; CUR_R_W=W | CLK_EN1; CLK_EN2; CLK_EN3; CLK_EN4; INHIBIT; R2_R3; REG_EN | CLK_EN5 | W |
| | | HOLD=0; W_INH_R6=1; CUR_R_W=W | CLK_EN1; CLK_EN2; CLK_EN3; CLK_EN4; CLK_EN5; INHIBIT; REG_EN | R2_R3 | R |
| | | HOLD=1 CUR_R_W=R | CLK_EN1; CLK_EN2; CLK_EN3; CLK_EN4; CLK_EN5; INHIBIT; REG_EN | R2_R3 | R |
| AH | H7-W4 | HOLD=0; W_INH_R6=1; CUR_R_W=R; W_INH_R7=1 | CLK_EN3; CLK_EN4; CLK_EN5; INHIBIT; R2_R3; REG_EN | CLK_EN1; CLK_EN2 | R |
| AI | W4-W5 | HOLD=0; HALT1=0; W_INH_R6=0; | CLK_EN1; CLK_EN4; R2_R3; INHIBIT | CLK_EN2; CLK_EN3; CLK_EN5; REG_EN | W |
| AJ | W5-W5 | HOLD=1 | CLK_EN1; CLK_EN2; CLK_EN3; CLK_EN4; CLK_EN5; INHIBIT; R2_R3 | REG_EN | W |
| AK | W5-W6 | HOLD=0 | CLK_EN1; CLK_EN2; CLK_EN3; CLK_EN5; R2_R3; INHIBIT; REG_EN | CLK_EN4 | R |
| AL | W6-W6 | HOLD=1 | CLK_EN1; CLK_EN2; CLK_EN3; CLK_EN4; CLK_EN5; INHIBIT; REG_EN | R2-R3 | R |
| AM | W6-H0 | HALT1=1 | CLK_EN1; CLK_EN2; CLK_EN3; CLK_EN4; INHIBIT; R2_R3; REG_EN | CLK_EN5 | R |
| AN | W6-BASE | HOLD=0; HALT1=0 | CLK_EN1; CLK_EN2; CLK_EN3; CLK_EN4; INHIBIT; R2_R3; REG_EN | CLK_EN5 | |

Built-in Self-Test.

The MIC contains circuitry to perform a deterministic test upon itself and report the results to the host microprocessor. This circuitry utilizes the serial scan paths within the MIC. The host microprocessor initiates BIST by setting Bit 0 in the MICs upper control register. Setting this bit enables the BIST Control Logic (BCL). The BCL immediately sets the MIC to a known state by clearing all internal registers and forcing all inputs to a known state. An 8-bit linear feedback shift register then generates a pseudo-random serial data stream which is fed into the serial scan paths. When all registers in the serial scan paths have been filled, the registers are taken out of scan mode by de-asserting scan enable. The data in the registers is then clocked through the MICs combinatorial logic for one clock cycle. Next, the registers are again placed in serial scan mode and the combinatorial results are shifted into a signature analysis register. Simultaneously, a new pseudo-random pattern is shifted into the registers via the scan path. This process is repeated 16,385 times. The result is a pattern in the signature analysis register that is unique to a properly functioning MIC. This pattern is compared to the known MIC signature and the MIC GO/NO_GO in the MIC's test results register is set. Additionally, the MIC signature is available to the host processor via the MIC's BIST results register. The MIC signals that BIST is complete by asserting the EMPTY* output.

SYSTEM OPERATION

Having described in detail the elements of the invention, we now turn to a description of one example of the operation of one illustrative embodiment of the invention so that the invention and its applications may be better understood by one skilled in the art.

Referring now to FIG. 3, at power-up, Microprocessor Control section of the MIC sets HARD_RESET low for a short period of time. The uP commands Built-in Self-Test (BIST) to be performed on the MIC. The uP 12 then loads the MIC control and background registers to initialize it. After initialization, the MIC is ready to run. The uP then commands the MIC to test memory. These results are stored in the status registers.

The MIC receives data (address, RGB, K, P, and Z) along with a data valid bit from the MIC. Data valid is active low. Through the use of the HALT bit, the MIC controls the rate at which the pipeline in the MIC and GIPP is running. HALT is active high. Whenever this bit is low, the data on the output of the GIPP is loaded into the MIC on the next rising edge of the clock causing the data in the GIPP and MIC to move one register. When HALT is high, both the MIC and GIPP shall hold data. Typically HALT shall be low every other clock cycle. HALT shall go high for more than one clock whenever the uP control section commands a HOLD or when an address collision occurs in the pipeline. HALT shall go low for more than one clock cycle whenever a screen clip or a Z-clip occurs. This allows for a higher effective throughput.

The MIC internal design requires that the inputs to and outputs from the memory be registered as shown in FIG. 3. During a write cycle, address and data are driven out of the MIC onto the bus. On the next clock, address and data are stored in the register A. During the next clock cycle, a read address is output from the MIC, while Register B has its output enabled and is driving data from the previous read cycle into the MIC. During this time, the data is being written into memory 100 from the previous write cycle (one clock earlier). The memory is responsible for generating its own write strobe based on the WRITE_EN* signal. The memory should only write if this signal is low.

It should be understood that various combinations of the techniques and principles taught by the present patent may be utilized without departing from the spirit and scope of the invention. Implementations which will be apparent to those skilled in the art are to be considered within the scope of the present invention so the invention is not limited to the specific disclosures used in connection with the preferred embodiment.

What is claimed is:

1. A memory interface controller apparatus for use in a graphics display system which includes a digital memory and a display screen having a viewable screen area and which receives serial input data representing a plurality of pixels and pixel addresses comprising:
   (a) first register means for receiving and latching the input data and presenting the input data at an output;
   (b) means for clipping connected to the output of the first register means wherein the clipping means clips the input data to retain clipped data having clipped data addresses only within the viewable screen area, wherein the clipping means has an output for passing the clipped data and clipped data addresses;
   (c) second register means for receiving clipped data from the clipping means output wherein the second register means includes an output for passing the clipped data;
   (d) third, fourth, fifth and sixth register means, each including an output, wherein the third register means has a first input connected to the output of the second register means, the fourth register means has an input connected to the output of the third register means, the fifth register means has an input connected to the output of the fourth register means, and the sixth register has an input connected to the output of the first register means wherein the third through sixth register means cooperates so as to serially pass the clipped data and the clipped data addresses;
   (e) seventh register means for passing clipped data having an input and an output;
   (f) means for calculating a K factor for the clipped data wherein the calculating means has a first stage and a second stage wherein the first stage is connected between the output of the sixth register means, and the input of the seventh register means, and wherein the second stage is connected to the output of the seventh register means; and
   (g) means for preventing address collisions arranged to receive data from the third through seventh registers and further including means for comparing the clipped data address in the third register to the clipped data addresses in the fourth through seventh registers, means for identifying identical clipped data addresses, means for clearing the contents of the fourth through seventh register means if an identical address is identified, and means for halting data flow at the third register until the fourth through seventh register means are cleared.

2. The apparatus of claim 1 further including means for operating the memory interface controller apparatus in an asynchronous mode.

3. The apparatus of claim 1 further including means for buffering pixel Z-depth data and comparing the Z-depth of one pixel against another.

4. The apparatus of claim 3 further including a means for storing a look-up table having internal values of K and 1-K in 1/16 increments ranging from 0 to 1, wherein the look-up table is arranged to transmit K factors to the 5th and 6th register means.

* * * * *